US009380293B2

(12) United States Patent
Marimon Sanjuan et al.

(10) Patent No.: US 9,380,293 B2
(45) Date of Patent: Jun. 28, 2016

(54) METHOD FOR GENERATING A MODEL OF A FLAT OBJECT FROM VIEWS OF THE OBJECT

(75) Inventors: David Marimon Sanjuan, Madrid (ES);
José Luis Landabaso Diaz, Madrid (ES); Oscar Divorra Escoda, Madrid (ES); José Carlos Pujol Alcolado, Madrid (ES)

(73) Assignee: TELEFONICA, S.A. (ES)

( * ) Notice: Subject to any disclaimer, the term of this patent is extended or adjusted under 35 U.S.C. 154(b) by 791 days.

(21) Appl. No.: 13/819,564

(22) PCT Filed: Jul. 11, 2011

(86) PCT No.: PCT/EP2011/061731
§ 371 (c)(1),
(2), (4) Date: Apr. 30, 2013

(87) PCT Pub. No.: WO2012/025288
PCT Pub. Date: Mar. 1, 2012

(65) Prior Publication Data
US 2013/0208098 A1    Aug. 15, 2013

(30) Foreign Application Priority Data
Aug. 27, 2010  (ES) .................................. 201031291

(51) Int. Cl.
*G06K 9/00*        (2006.01)
*H04N 13/02*       (2006.01)
*G06T 7/00*        (2006.01)

(52) U.S. Cl.
CPC .......... *H04N 13/0239* (2013.01); *G06T 7/0075* (2013.01); *G06T 2200/24* (2013.01); *G06T 2207/10012* (2013.01); *G06T 2207/20101* (2013.01)

(58) Field of Classification Search
None
See application file for complete search history.

(56) References Cited

U.S. PATENT DOCUMENTS

| | | | |
|---|---|---|---|
| 8,933,925 B2* | 1/2015 | Sinha | .................... G06T 7/0065 345/419 |
| 2002/0123680 A1 | 9/2002 | Vaillant et al. | |
| 2009/0040220 A1 | 2/2009 | Gibbs et al. | |

FOREIGN PATENT DOCUMENTS

| | | |
|---|---|---|
| JP | 2004220312 A | 5/2004 |
| JP | 2007249591 A | 9/2007 |

OTHER PUBLICATIONS

Intenational Search Report for corresponding application PCT/EP2011/061731 filed Jul. 11, 2011; Mail date Sep. 30, 2011.
Michael Bleyer, "A layered stereo matching algorithm using image segmentation and global visibility constraints", ISPRS Journal of Photogrammetry and Remote Sensing 59 (2005) 128-150.

(Continued)

*Primary Examiner* — Chan Park
*Assistant Examiner* — Elisa Rice
(74) *Attorney, Agent, or Firm* — Cantor Colburn LLP

(57) ABSTRACT

A method for generating a model of a flat object from views taken by at least two calibrated cameras, which is capable of generating two-dimensional and volumetric representations of the object, where the representations can be a depth map, a volumetric representation or a mesh representation, method including the following basic steps: calibrating at least two cameras, calculating several 3D coordinates of at least three points belonging to the same plane of the flat object, calculating the equation of the plane of the flat object, selecting at least one region representing the surface of the flat object, in at least one view provided by at least one camera, and calculating the intersection between the selected region representing the surface of the object and the equation of the plane.

18 Claims, 8 Drawing Sheets

(56) References Cited

OTHER PUBLICATIONS

Heung-Yeung Shum, "Interactive 3D Modeling from Multiple Images Using Scene Regularities", Lecture Notes in Computer Science/MICCAI 2000, Jun. 1, 1998, pp. 236-252; XP000852872.

Sylvie Treuillet, "Three-Dimensional Assessment of Skin Wounds Using a Standard Digital Camera", IEE Translactions on MEdical Imaging vol. 28, No. 5 May 5, 2009.

Written Opinion for corresponding application PCT/EP2011/061731 filed Jul. 11, 2011; Mail date Sep. 30, 2011.

* cited by examiner

METHOD FOR GENERATING A MODEL OF A FLAT OBJECT FROM VIEWS OF THE OBJECT

OBJECT OF THE INVENTION

The present invention, as expressed in the title of this specification, relates to a method for generating a model of a flat object from views of the object provided by at least two cameras taking views of the object. Representations such as a depth map of the flat object, a volumetric representation of the flat object and a mesh representation of the flat object can be obtained by means of the method of the present invention. The method of the present invention is especially aimed at the modeling of objects in three dimensions by means of analyzing two-dimensional views for their subsequent reconstruction in three dimensions. Its application ranges from the telepresence by videoconference to the generation of models for various purposes: analysis, education, recreation, etc.

BACKGROUND OF THE INVENTION

The existing state of the art discloses different types of methods for modeling an object. Said methods are mainly classified into passive methods and active methods. In the area of active methods, sensors such as laser or structured light scanners or also Time-of-Flight type cameras are used. There are other possibilities such as projecting, with the aid of a video projector, a known pattern on an object and deducing the shape of the object by means of analyzing the deformation experienced by the pattern due to the shape of the object.

In the area of passive methods, most techniques exploit the geometric triangulation relating two or more views of the object of interest.

The present invention is in the field of the passive methods which include the following approaches of modeling objects based on views:

Structure from Motion, SfM, consisting of estimating the model of the scene in front of a camera in motion. However, the technique is only applicable to a set of multiple static cameras. Generally, an SfM algorithm establishes the match between the views of a set of points in the scene. By means of establishing this match, it is possible to triangulate the position of the points in the three dimensions of the space in front of one or several cameras. From this point, there are several possibilities for generating a model of an object. One possibility is using triangulation to calibrate the position of the camera throughout its motion or the position of each static camera. A dense model of the shape of the scene can be obtained, for example, by means of Shape from Stereo. Another possibility is assuming that the surface between any three points is locally flat. This model is therefore obtained by connecting points in groups of three by a triangle. The set of 3D triangles form a mesh representing the shape of the object. In this sense methods which reconstruct parts of the flat object are known from the state of the art. Firstly, matches between flat segments are established. Four points per segment or region are found and then a homography is induced. This homography allows establishing the epipolar geometry between the views. Finally, the set of segments can be positioned in 3D.

3D volumetric reconstruction. This approach encompasses from the least to the most precise modeling. For example, the box delimiting the real object would be a too coarse model. There are more precise models such as the Convex Hull (CH), the Visual Hull (VH) and the Photo Hull (PH). One of the most widespread volumetric models due to its good ratio between precision and low computational cost is the Visual Hull (VH). The Visual Hull is obtained by means of a method referred to as Shape-from-Silhouette (SfS). In a first phase, the Shape-from-Silhouette extracts the active entities of the scene (silhouettes of the object) by means of a set of cameras. The Visual Hull therefore corresponds with the volume inside the intersection of the cones going from the optical center of the cameras through the silhouettes in the optical planes of the cameras. The set of cameras must be intrinsically and extrinsically calibrated beforehand. The calibration can thus be obtained using the set of control points the coordinates of which are automatically known as a set of characteristic key points, as in the Structure from Motion approach.

Shape from Shading, "SfSh", deals with recovering the shape from a gradual variation of the shading in the view. The idea behind Shape from Shading is that the color intensity can be described as a function of the surface, the shape, and the direction of the light source. Most SfSh algorithms assume that the direction of the light source is known.

The passive methods described above have several drawbacks depending on the method used. In the case of methods based on Structure from Motion (SfM), the drawbacks arise from the objects without texture. In fact, in the absence of texture on the surface of the object, the resulting model is very coarse. In the case of very limited texture but with sufficient points for calibrating the set of cameras, the Shape from Stereo method can be used. However, the result of the previous method has the drawback that it is not capable of isolating the object from the objects forming the background or surrounding the object which is being modeled. In the particular case of the methods described above and which are based on finding four points of a segment and generating a homography, the entire calibration process depends on the possibility of establishing a match between the detected planes, which is not viable for objects without texture.

On the other hand, the Visual Hull obtained with a generic SfS method mainly depends on two aspects. Firstly, the positions of the cameras determined the efficiency of the SfS method. Another limitation of the applicability of this method is that the silhouettes are extracted by comparison with a known static background. This means that the object cannot be present in the scene when the background is captured. Consequently, this method is only valid for objects which can be easily obtained or introduced in the scene but not for modeling a part of a room, such as a wall or a fixed board.

It would therefore be desirable to find a method for generating a model of a flat object from views of the object which does not depend on the texture of the object to be modeled or on the consequent limitation involved in the correct calibration of the cameras, as well as to the capacity to move the object to be modeled with respect to the background or to the site in which the object is located.

DESCRIPTION OF THE INVENTION

To achieve the objectives and prevent the drawbacks indicated above, the present invention consists of a method for generating a model of a flat object from the views of the object. Said method is based on two concepts: the epipolar geometry and the segmentation of the image. The epipolar geometry establishes the geometric relationships between two or more cameras capturing the same scene. The segmentation of the image consists of generating segments (regions) or areas of an image that have similar characteristics: such as the color.

The present invention covers a method which generates a volumetric model of a flat object. The method of the present invention uses the epipolar geometry relationships between two or more cameras, and the segmentation of the surface of the object seen by said cameras. The method is separated into two large steps. The first step consists of calculating the equation of the plane in 3D defining the surface of the flat object. To that end, the method of the present invention uses the triangulation of three points belonging to the flat object. The second step consists of finding the segment (region), in one or more views, which best represents the object. With the calibration of the cameras it is possible to find the ray defined by each image point (pixel) belonging to the segment. Finally, the volumetric representation of the object is determined by the intersection of all the rays with the plane defined by the equation of the plane in three dimensions.

The method for generating a model of a flat object from views of the object of the present invention generates a representation selected from among a depth map of the flat object, a three-dimensional representation of the flat object and a mesh representation of the flat object, by means of at least the following steps:

i) calibrating at least a first camera and a second camera;

ii) calculating 3D coordinates of at least three points belonging to a plane of the flat object;

iii) calculating an equation of the plane comprised in the flat object;

iv) selecting at least one region representing the surface of the flat object, in at least one optical or image plane provided by at least one camera; and, v) calculating the intersection between the selected region representing the surface of the object and the equation of the plane.

Step i) additionally comprises calculating the extrinsic and intrinsic parameters of at least the first camera and the second camera by solving the equations for as many points in 2D/3D as degrees of freedom comprised by the cameras.

Step ii) additionally comprises:

selecting a point and a first image point, in which the first image point represents the selected point in the plane of the image provided by the first camera, and in which the selected point is comprised in the flat object;

calculating a first ray joining the center of the first camera with the first image point, and also with the selected point. (Obviously, the center of the first camera, the first image point and the selected point are aligned).

calculating the projection of the selected point on the image plane provided by the second camera.

calculating at least one second ray by means of at least the image plane of the second camera, connecting the center of the second camera with the second image point, and also with the selected point;

determining the 3D coordinates of the selected point by means of calculating the point of intersection between the first ray and the at least one second ray;

repeating the previous steps for at least two more points, obtaining at least the 3D coordinates of three points belonging to the plane of the flat object.

The aforementioned projection of the selected point on the image plane of the second camera is calculated by means of a calculation option selected from manual and semiautomatic.

The manual calculation option comprises a user, by means of a graphical user interface showing at least the image plane provided by the second camera, selecting the image point which best represents the point previously selected by means of the image plane provided by the first camera.

The semiautomatic calculation option is selected from among a set of semiautomatic levels comprised by a low level, a medium level and a high level.

To calculate the projection by the low level of the semiautomatic calculation option, the following steps are performed:

calculating an epipolar line in at least the image plane provided by a second camera, wherein the epipolar line is the line drawn on the image plane of the second camera representing the first ray by means of the calibration of the cameras;

representing the epipolar line by means of the graphical user interface; and, selecting a second image point on the graphical user interface, wherein the second image point is the selected point along the epipolar line which best represents the selected point by means of the image plane provided by the first camera.

To calculate the projection by the medium level of the semiautomatic calculation option, the following steps are performed:

a) determining a first image area containing at least the first image point and storing at least one information value of image points selected from among the color, the color intensity and a combination thereof, of at least the first image point and each of the image points surrounding the first image point;

b) calculating an epipolar line in at least the image plane provided by a second camera, wherein the epipolar line is the line drawn on the image plane of the second camera representing the first ray by means of the calibration of the cameras;

c) determining a second image area comprising at least one image point comprised in the epipolar line, and storing at least one information value of the image point selected from among the color, the color intensity and a combination thereof, of at least the image point contained in the epipolar line and each of the image points surrounding the image point contained in the epipolar line;

d) comparing the information value of the image point of the first image area with the information value of the image point of the second image area;

e) repeating steps c) and d) for each of the image points forming the epipolar line; and f) selecting a second image point from among a group of image points formed by the image points obtained in each repetition by means of an option selected from manual and automatic. The automatic form comprises selecting the second image point as the image point from the total image points comprised by the epipolar line, for which the second image area of the image point comprises a reproduction index of the first image area greater than a threshold. The manual form comprises highlighting with a predetermined color the second image point, which is selected as the image point from the total image points comprised by the epipolar line, for which the second image area of the second image point comprises a reproduction index of the first image area greater than a threshold, and selecting a point from among the points highlighted by the graphical user interface.

To calculate the projection by the high level of the semiautomatic calculation option, the following steps are performed:

a) determining a group of characteristic points in at least the image planes provided by the first camera and the second camera. These characteristic points being those located in the corners and the edges of any object (flat or non-flat), and, on the surface of objects with texture, the points obtained by the corner detection algorithm selected from the Moravec corner detection algorithm, the Harris and Stephens/Plessey corner detection algorithm, the multi-scale Harris operator, the Shi and Tomasi corner detection algorithm, the level curve curvature approach, the characteristic detection of DoH (Determinant of Hessians), DoG (Difference of Gaussians) and LoG (Laplacian of Gaussians), the Brady and Wang corner detection algorithm, the SUSAN corner detection algorithm, the Hedley and Trajkovic corner detection algorithm, the FAST detector of characteristics, the automatic synthesis point detector with genetic programming, the operators of points of interest with adapted affinity and any other of the state of the art;

b) pairing the first image point with a previously determined characteristic point;

c) determining a first image area containing at least the first image point and storing at least one information value of the image point selected from among the color, the color intensity and a combination thereof for at least the first image point and each of the image points surrounding the first image point;

d) calculating an epipolar line in at least the image plane provided by the second camera, wherein the epipolar line is the line drawn on the image plane of the second camera representing the first ray by means of the calibration of the cameras;

e) determining a second image area comprising at least one image point comprised in the epipolar line, and storing at least one information value of the image point selected from among the color, the color intensity and a combination thereof, of at least the image point contained in the epipolar line and each of the image points surrounding the image point contained in the epipolar line;

f) comparing the information value of the image point of the first image area with the information value of the image point of the second image area;

g) repeating steps e) and f) for each of the image points forming the epipolar line; and f) selecting a second image point from among a group of image points formed by the image points obtained in each repetition by means of an option selected from manual and automatic. The automatic form comprises selecting the second image point as the image point from the total image points comprised by the epipolar line, for which the second image area of the image point comprises a reproduction index of the first image area greater than a threshold. The manual form comprises highlighting with a predetermined color the second image point, which is selected as the image point from the total image points comprised by the epipolar line, for which the second image area of the second image point comprises a reproduction index of the first image area greater than a threshold, and selecting a point from among the points highlighted by the graphical user interface.

The first image point and at least the second image point allow defining the two aforementioned rays in the second substep and the fourth substep of step ii). A ray (first ray) is defined by three points (center of the camera, first image point and the selected point) belonging to a line. The other at least one ray (one per camera) is defined by three points (center of the camera, second image point, and the selected point) belonging to a line.

Thus, the ray connecting the center of the first camera with the selected point and the ray connecting the center of the second camera with the selected point are defined by the respective line equations by means of the following steps:

obtaining the 3D location of the center of the camera of the calibrated coordinate system;

obtaining the 3D location of the first image point and of the second image points which represent the same selected point in at least the image plane of the first camera and the image plane of the second camera respectively;

determining at least a first line equation and a second line equation. The first line equation is described by the vector connecting the 3D location of the center of the first camera with the 3D location of the first image point and the second line equation is described by the vector connecting the 3D location of the center of the second camera with the 3D location of the second image point.

Then, to determine the coordinates of at least one point in 3D by means of calculating the point of intersection between the at least two rays further comprise:

establishing the coordinates of at least one point in 3D when the point of intersection between the two rays simultaneously belongs to the first equation and the second equation which determine the two rays;

calculating the coordinates of a point in 3D the distance of which to the first ray and at least the second ray is minimum when there is no a point of intersection between the first ray and at least the second ray.

On the other hand, step iii) of the method of the present invention additionally comprises calculating the expression of the plane determined by the following equation:

$$a_N(x-x_D)+b_N(y-y_D)+c_N(z-z_D)=0$$

wherein $x_D$, $y_D$ and $z_D$ are the coordinates of the point in 3D belonging to the plane of the object and $a_N$, $b_N$, and $c_N$ are the coordinates of a vector N normal to the plane. The vector N normal to the plane is the vector product of two vectors belonging to the plane and defined by at least three points in the plane of the flat object.

Furthermore, step iv) of the method of the present invention is performed by means of an option selected from manual and automatic;

The manual option comprises at least the following steps:

calculating a sub-region which comprises selecting each of the image points surrounding an image point selected by means of the graphical user interface. These image points comply with a similarity criterion. The similarity criterion is a predetermined comparison between information values of the image points selected from among the color, the color intensity and the information values of the image points selected from the color and the color intensity of each of said image points surrounding the image point;

repeating the previous step for as many subregions as established by the user; and forming a region of the flat object by means of the connection of the previously calculated subregions.

On the other hand, the automatic option starts with the calculation of the selected point, the first image point and at least the second image point previously defined in the semi-automatic calculation option for calculating the projection of the selected point on the image plane provided by the second camera (third substep of step ii of the method). The automatic option comprises at least the following steps:

selecting at least two image points in one and the same image plane which best represent the at least two points of the flat object, in which these two image points are selected from among the two first image points in the image plane of the first camera and the two second image points of the image plane of at least the second camera;

storing the information values of the image point selected from among the color and the color intensity of the image points comprised in the line segment connecting the two image points selected in the previous step;

calculating a two-dimensional histogram which represents in one dimension all the possible information values of the image point given by the image point in the space domain, and in the other dimension, the number of times that a certain information value of the image point selected from the color and the color intensity has appeared in the line segment. Therefore, the histogram has peaks for the information values of the image point selected from the most repeated color and color intensity;

identifying, for each peak of the histogram, the image points which, comprised in the line segment, have the information values of the image point of color and color intensity represented in each of the peaks;

calculating a sub-region for each of the identifying image points which are formed by the image points surrounding the identifying image point and which comply with the similarity criterion;

repeating the previous step for as many subregions as identifying image points have been identified; and forming a region of the flat object by means of the connection of the previously calculated subregions.

To calculate the intersection between the region representing the surface of the object and the equation of the plane, the method of the present invention additionally comprises the following four substeps:

finding, for each region formed in the image plane of the first camera, at least one ray passing through the center of the first camera and a point comprised in each region;

finding the point of intersection between said at least one ray and the plane. This point of intersection represents the 3D coordinates of a point belonging to a real flat object;

repeating the two previous substeps for each point forming the region and forming a point cloud when the region is formed for at least two points;

joining the points of intersection found by at least the first camera inside the selected region.

The four previous substeps are optionally repeated replacing the first camera with the at least second camera. Furthermore, the four aforementioned substeps are executed only once with at least the second camera. Therefore, the first camera can be replaced with the second camera or any other camera comprised in a system based on two or more cameras.

With all the steps and substeps of the method of the present invention thus described, the elements for generating any of the selected representations are obtained from a depth map of the plane of the object, a volumetric representation (also known as three-dimensional representation) of the object and a mesh representation of the plane of the object.

The method additionally comprises the following steps for performing the representation of the depth map of the flat object:

selecting a flat region belonging to the object to be modeled;

analyzing, in an image plane of a specific camera, the image points of the region corresponding to said flat region;

calculating, for each point, the distance from the center of the camera to each point of the flat region;

repeating the two previous steps for each point belonging to the flat region; and, representing the depth map with the previously calculated distances and giving a value selected between zero and a first predetermined value to all the points which are comprised in the selected flat region. For all the points which are not comprised in the selected flat region but which belong to the image plane, a second predetermined value is assigned.

The method comprises the following steps for performing the volumetric representation of the flat object:

defining a common coordinate system by means of the calibration of an array of cameras formed by at least two cameras;

defining a delimiting box comprising the object to be modeled with reference to the defined coordinate system;

dividing the delimiting box into small volume elements referred to as voxels;

determining for each voxel comprised in the delimiting box whether said voxel is occupied by means of an algorithm selected from a simple algorithm and an improved algorithm; and, representing the volumetric representation by means of representing the occupied voxels.

The simple algorithm comprises performing the following substeps:

calculating the coordinates of the centroid of each voxel;

calculating the distance from the centroid to a point of the point cloud; and, labeling the voxel as "occupied" if the previously calculated distance between the centroid and the point of the point cloud is less than a predetermined threshold, and labeling the voxel as "unoccupied" if the previously calculated distance is greater than the predetermined threshold.

Whereas the improved algorithm comprises performing the following substeps:

calculating the coordinates of the centroid of each voxel;

calculating the distance from the centroid to the center of the camera;

identifying the point in the point cloud with the minimum distance to the centroid and the length of the ray passing through the voxel and the center of the camera;

calculating the distance between the point identified in the point cloud and the center of the camera; labeling the voxel as "occupied" if the previously calculated distance between the centroid and the center of the camera is greater than or equal to the distance between the point identified in the point cloud and the center of the camera and otherwise labeling the voxel as "unoccupied"; and applying improvements on the improved algorithm by means of improvements selected from:

an intersection by volumes which is obtained by means of the two following substeps:

determining the occupation of the voxels using the center of the camera provided by the first camera and at least the second camera independently; and, labeling the voxel as "occupied" if and only if it is labeled as "occupied" in each of the views provided by the first camera and the at least second camera;

an occupation by thickness, comprising the following substeps:

selecting the thickness "T" of the flat object;

calculating the coordinates of the centroid of each voxel;

calculating the distance from the centroid to the center of the camera;

identifying the point in the point cloud with the minimum distance to the centroid and the length of the ray passing through the voxel and the point in the center of the camera;

calculating the distance between the point identified in the point cloud and the center of the camera; and labeling the voxel as occupied if the previously calculated distance between the centroid and the center of the camera is greater than or equal to the distance between the point identified in the point cloud and the center of the camera, and smaller than the distance between the point identified in the point cloud and the center of the camera plus the thickness "T" and otherwise labeling the voxel as "unoccupied";

a intersection by volumes with occupation by the thickness which obtains the intersection of the different volumes by means of the following substeps:

determining the occupation of the voxels using the center of the camera provided by the first camera and at least the second camera independently;

selecting the thickness "T" of the flat object;

calculating the coordinates of the centroid of each voxel;

calculating the distance from the centroid to the center of the camera;

identifying the point in the point cloud with the minimum distance to the centroid and the length of the ray passing through the voxel and the point in the center of the camera;

calculating the distance between the point identified in the point cloud and the center of the camera;

labeling in each view provided by the first camera and the second camera the voxel as "occupied" if the previously calculated distance between the centroid and the center of the camera is greater than or equal to the distance between the point identified in the point cloud and the center of the camera and smaller than the distance between the point identified in the point cloud and the center of the camera plus the thickness "T" and otherwise labeling the voxel as "unoccupied"; and, labeling the voxel as "occupied" if and only if it is labeled as "occupied" in each of the views provided by the first camera and the at least second camera.

On the other hand, to perform the mesh representation of the flat object, the following steps are performed:

determining three points for each locally flat surface comprised in the flat object;

joining the three points forming a triangle;

joining the triangles obtained forming a mesh; and, representing the mesh.

The description thus described has mainly been made based on two cameras, extending to any number of cameras wherein the references to the second camera and the image plane produced by the second camera are replaced by the third camera and the image plane of the third camera, the fourth camera and the image plane of the fourth camera, etc. The same would occur with the second image point.

A quick modeling of any object comprising flat segments is obtained by the previously described steps of the method of the present invention. This is due to the calibration process which is easy and is only performed once for a determined configuration of cameras.

The modeling of objects by means of techniques based on views is closely related to the SfS and SfM methods. The great advantage of the present invention over said methods is that it enables selecting the surface of the object manually or automatically, enabling overcoming the limitation of the texture of the SfM method. The present invention can be applied on an unprepared room with static furniture, which involves a limitation of the SfM method. Said methods based on SfS techniques can only be used after the manual selection of the segments. It is not possible to determine the plane, and therefore a coarse representation of the Visual Hull is obtained.

The present invention includes two modes for obtaining a model of an object, manual or semiautomatic. The present invention allows the control in each step of a semiautomatic process in contrast to the methods of the prior art based on SfM or SfS techniques, allowing a more controlled result of the method.

DESCRIPTION OF AN EMBODIMENT OF THE INVENTION

A description of several embodiments of the invention, with reference to the numbers used in the figures, is made hereinafter with an illustrative and non-limiting character.

Figure 1:
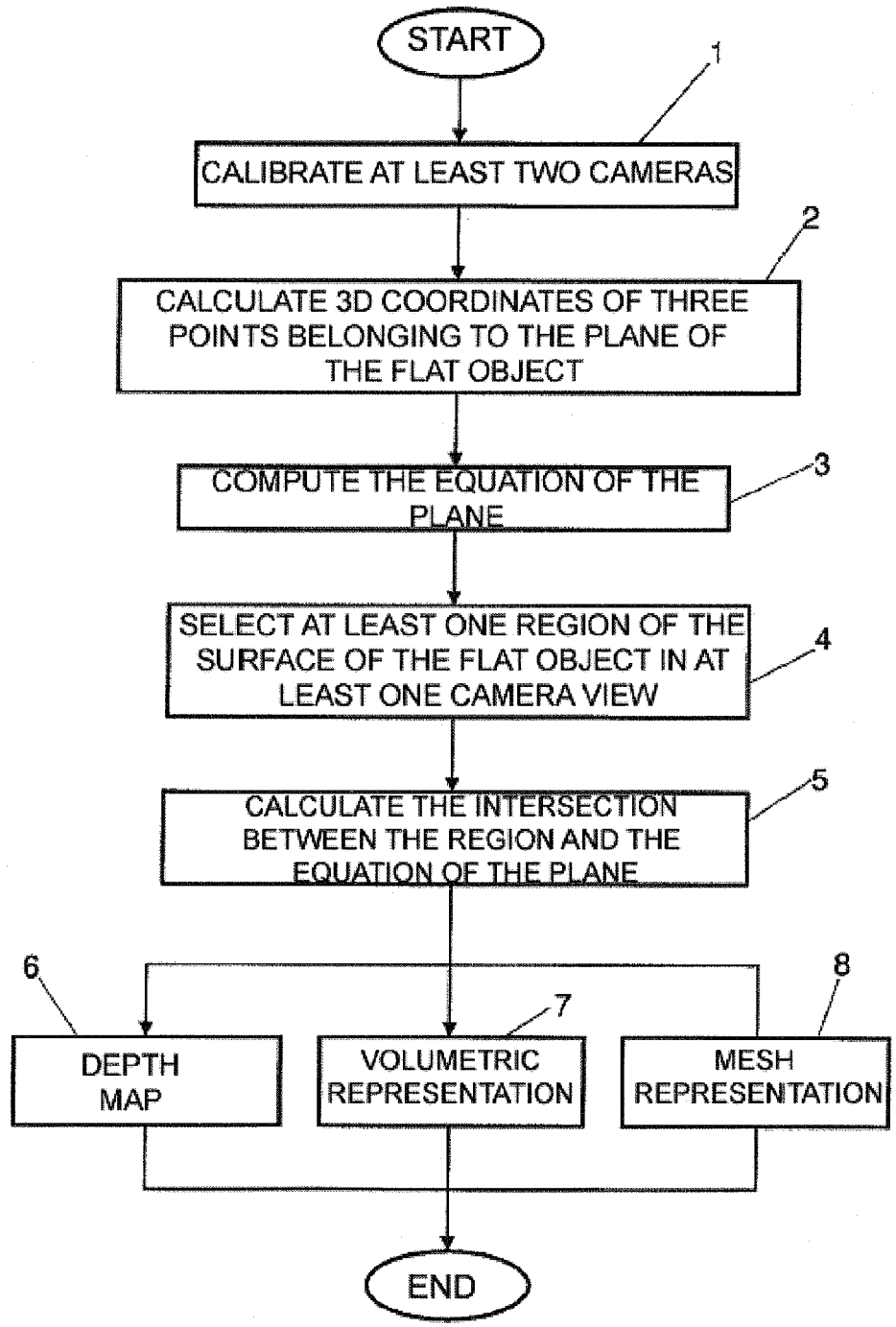
FIG. 1 shows a flow chart of the method of the present invention in which the main steps of the method are shown.

FIG. 1 shows a flow chart of the method of the present invention in which the main steps of the method are shown. The steps of the method are: calibrating at least two cameras (1), calculating the 3D coordinates of at least three points belonging to the same plane of the flat object (2), calculating the equation of the plane comprised in the flat object (3), selecting at least one region representing the surface of the flat object in at least one image plane provided by at least one camera (4) and calculating the intersection between the selected region representing the surface of the object and the equation of the plane (5). A representation selected from among a depth map (6) of the flat object, a volumetric representation (7) of the flat object and a mesh representation (8) of the flat object is obtained by means of these steps.

Figure 2:
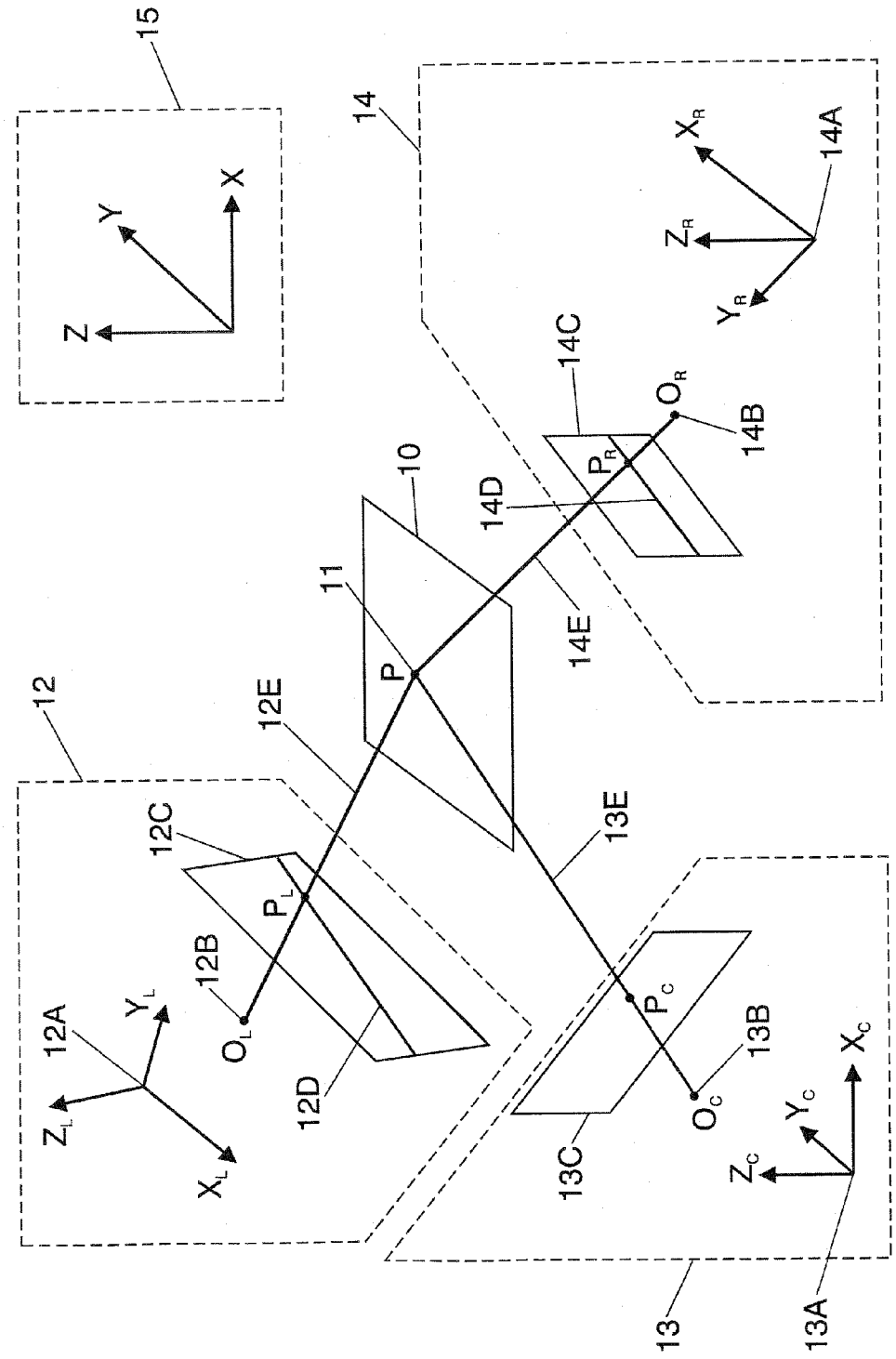
FIG. 2 shows an implementation of the method of the present invention in which a flat object, a point "P" comprised in the flat object, three cameras and a global coordinate system are shown.

FIG. 2 shows an implementation of the method of the present invention in which a flat object (10), a point P (11) comprised in the flat object, a first camera (12), a second camera (13), a third camera (14) and a global coordinate system (15) are shown. To calibrate the three previous cameras with respect to the global coordinate system, the extrinsic parameters are calculated by means of the translation and rotation matrices relating the inner coordinate system of each camera (12A, 13A, 14A) with the global coordinate system (15). Additionally, the centers of each camera $O_L$ (12B), $O_C$ (13B) and $O_R$ (14B) which can optionally be the focal point of each camera, as well as the image planes (12C, 13C, 14C) provided by each of the three cameras (12, 13, 14), are obtained with the intrinsic calibration of each camera. The image point ($P_L$, $P_C$, $P_R$) representing the selected point P (11) is also shown on each of the image planes (12C, 13C, 14C). Furthermore, it shows how the parts comprising epipolar geometry are calculated. Firstly, a ray (13E) joining, for example, the center ($O_C$) of the second camera with the image point (Pc) of the image plane representing the selected point P (11) is calculated. Another ray (12E, 14E) can be obtained for each camera with a similar process. Then, the epipolar lines (12D, 14D) on the image plane of the first camera and on the image plane of the third camera, respectively, are calculated, the epipolar lines being the calculated projections of the ray (13E) on the image plane of the first camera and on the image plane of the third camera, respectively. The epipolar lines (12D and 14D) are drawn on the image plane (12C, 14C) of each of the cameras. The projections of the ray (13E) on the image plane are calculated with the calibration of the cameras which is based on the global position system.

Figure 3:
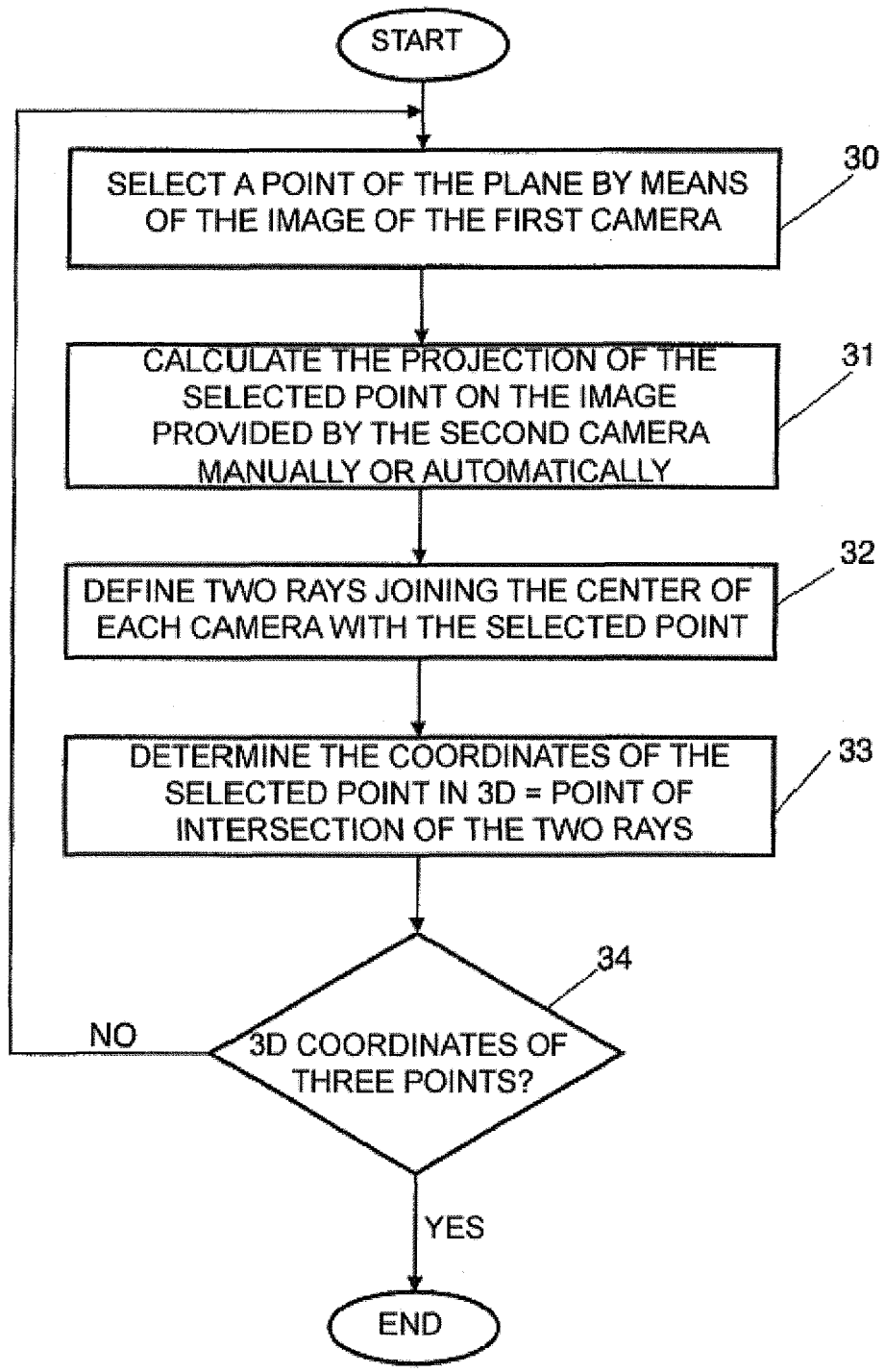
FIG. 3 shows a flow chart of the method of the present invention for calculating the coordinates in three dimensions of three points belonging to the same plane.

FIG. 3 shows a flow chart of the method of the present invention for calculating the 3D coordinates of at least three points belonging to the same plane. The first step is to select a point of the plane comprised in the flat object by means of the image plane provided by the first camera (30). The second step is to calculate the projection of the selected point on the image plane provided by the second camera by a manual or semiautomatic mode (31). The third step is to define two rays by means of the image plane of the first camera and the image plane of the second camera, one per camera and the selected point, connecting the center of the first camera with the selected point and the center of the second camera with the selected point (32). The fourth step is to determine the coordinates of the selected point in 3D calculating the point of intersection between the two rays (33). The fifth step is to repeat the previous steps until the 3D coordinates of the three points belonging to the plane of the flat object (34) are obtained.

Figure 4:
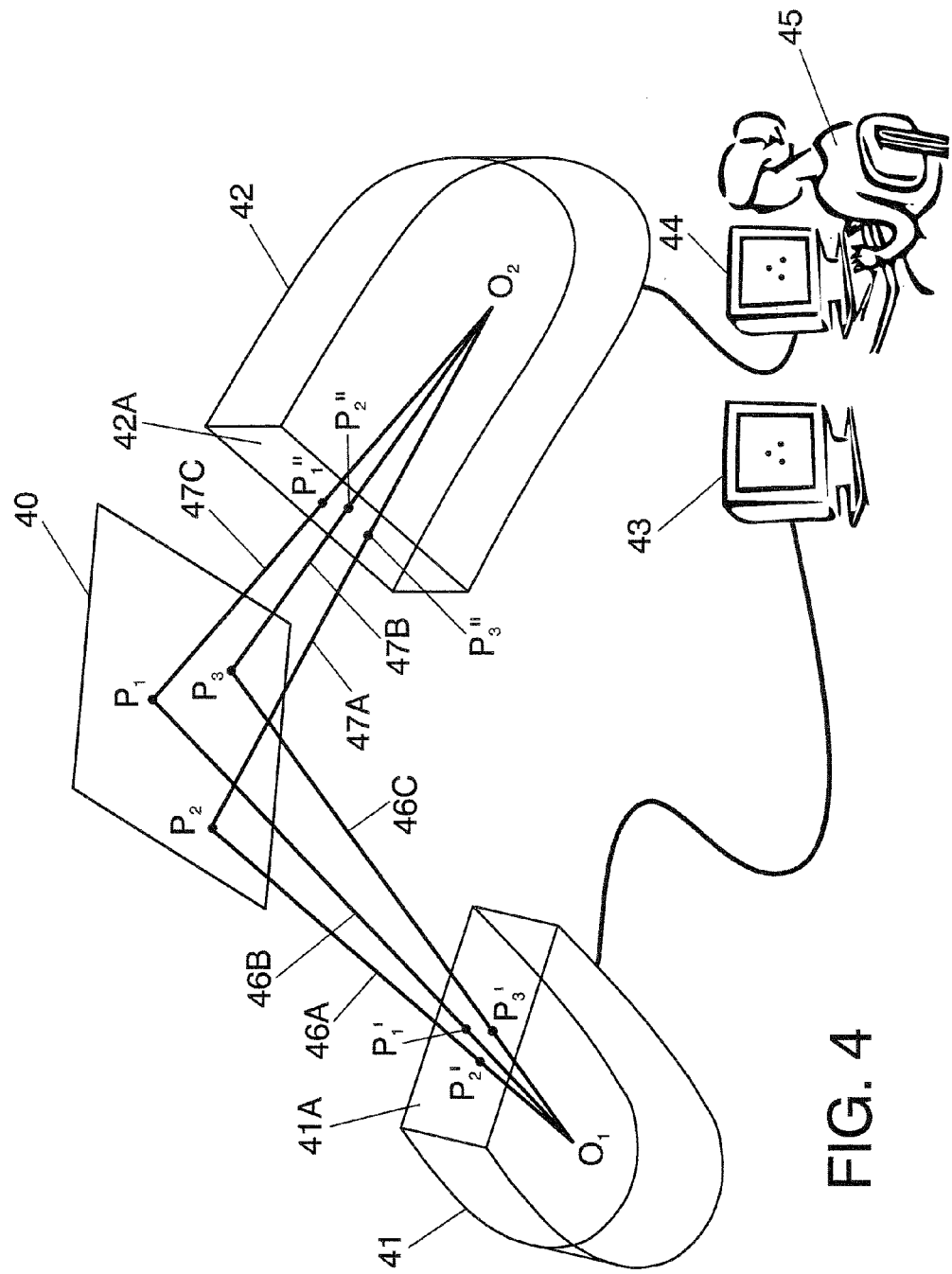
FIG. 4 shows an implementation of the method of the present invention in which the manual option for selecting the projection of a point is shown.

FIG. 4 shows an implementation of the method of the present invention for the manual option of calculating the projection of a selected point on the image plane of the second camera. The implementation comprises a flat object (40) which in turn comprises three points $P_1$, $P_2$, and $P_3$, a first camera (41) comprising an image plane (41A) shown by a graphical user interface (43), a second camera (42) comprising an image plane (42A) shown by means of the graphical user interface (44). A user (45), by means of the graphical user interface (44) showing the image plane (42A) of the second camera (42), selects the image point which best represents the point previously selected by means of the image plane (41A) of the first camera (41). The centers of the first and the second camera $O_L$ and $O_R$ are also shown, as are the rays (46A, 46B, 46C, 47A, 47B, 47C) joining the centers ($O_1$, $O_2$) of the cameras with the image points shown ($P_1'$, $P_2'$, $P_3'$) or selected ($P_1''$, $P_2''$, $P_3''$) by the user (45), also joining the points ($P_1$, $P_2$, $P_3$) comprised in the flat object (40).

Figure 5:
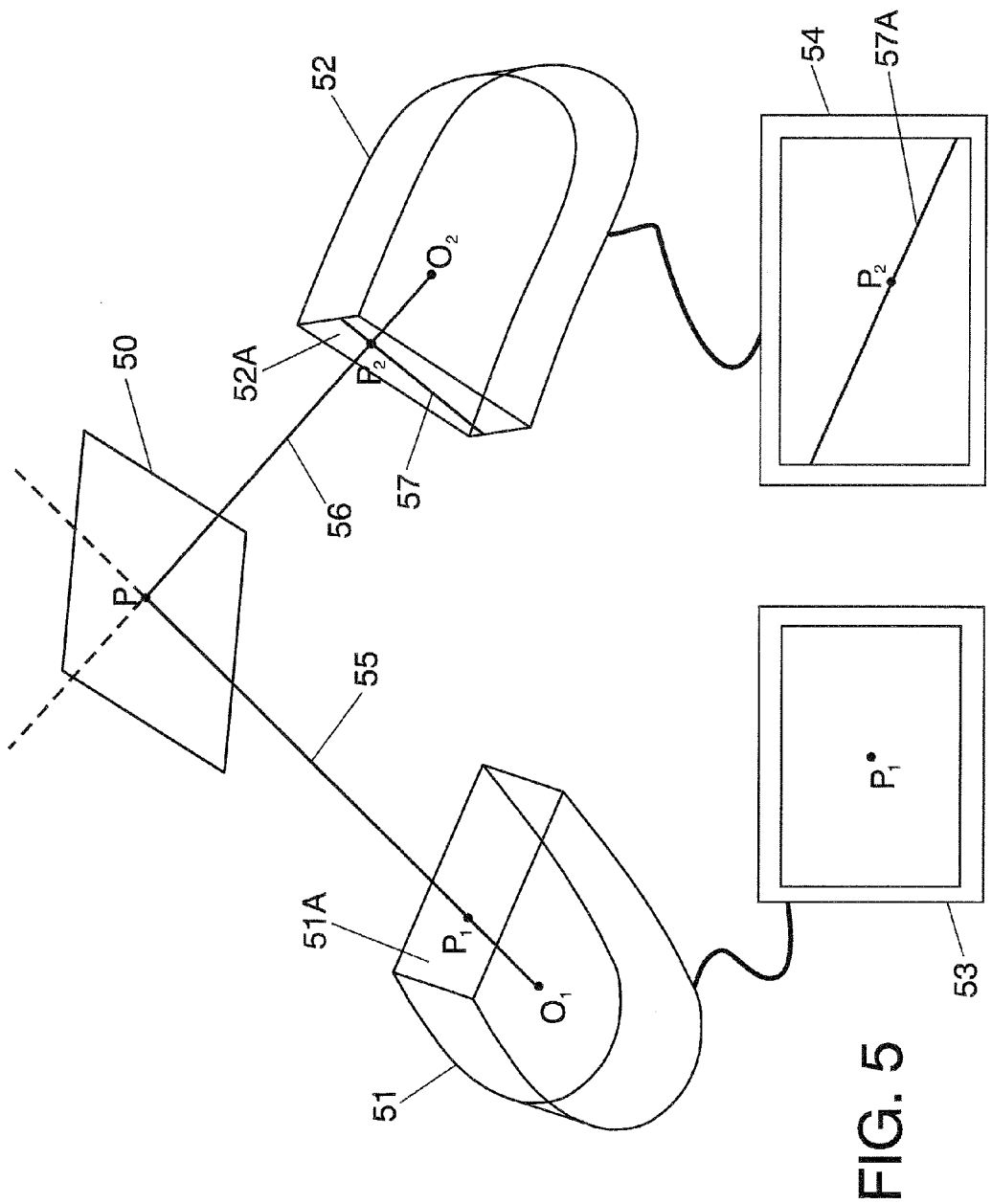
FIG. 5 shows an implementation for the steps of the method of the present invention corresponding to the low level of semiautomatic calculation of the projection of a point.

FIG. 5 shows an implementation for the steps of the method of the present invention corresponding to the low level of the semiautomatic calculation of the projection of a point "P" selected by means of the image plane (51A) of the first camera (51) on the image plane (52A) of the second camera (52). The first step is to select a first image point ($P_1$) of the image plane (51A) representing a selected point (P) of the flat object (50) by means of an interface (53) representing the selected point in the image plane of the first camera (51). The second step is to calculate a first "infinite" ray passing through the center ($O_1$) of the first camera (51) and the first image point ($P_1$). To improve understanding, the first ray (55) and the second ray (56) are shown with a solid line from the center of the cameras to the point P, and with dotted lines from the point P to infinity. Since the 3D coordinates of the center ($O_1$) and the first image point ($P_1$) are known, the coordinates of the first ray are automatically calculated. The third step is to calculate the epipolar line (57) on the image plane of the second camera (52). The epipolar line is the line on the image plane of the second camera representing the first ray. The epipolar line (57) is represented as a line (57A) on the user interface (54). In the fourth step, the user selects a second image point (P2) as an image point along the epipolar line (57) which best represents the selected point (P) by means of the user interface (54) connected to the second camera (52).

Figure 6:
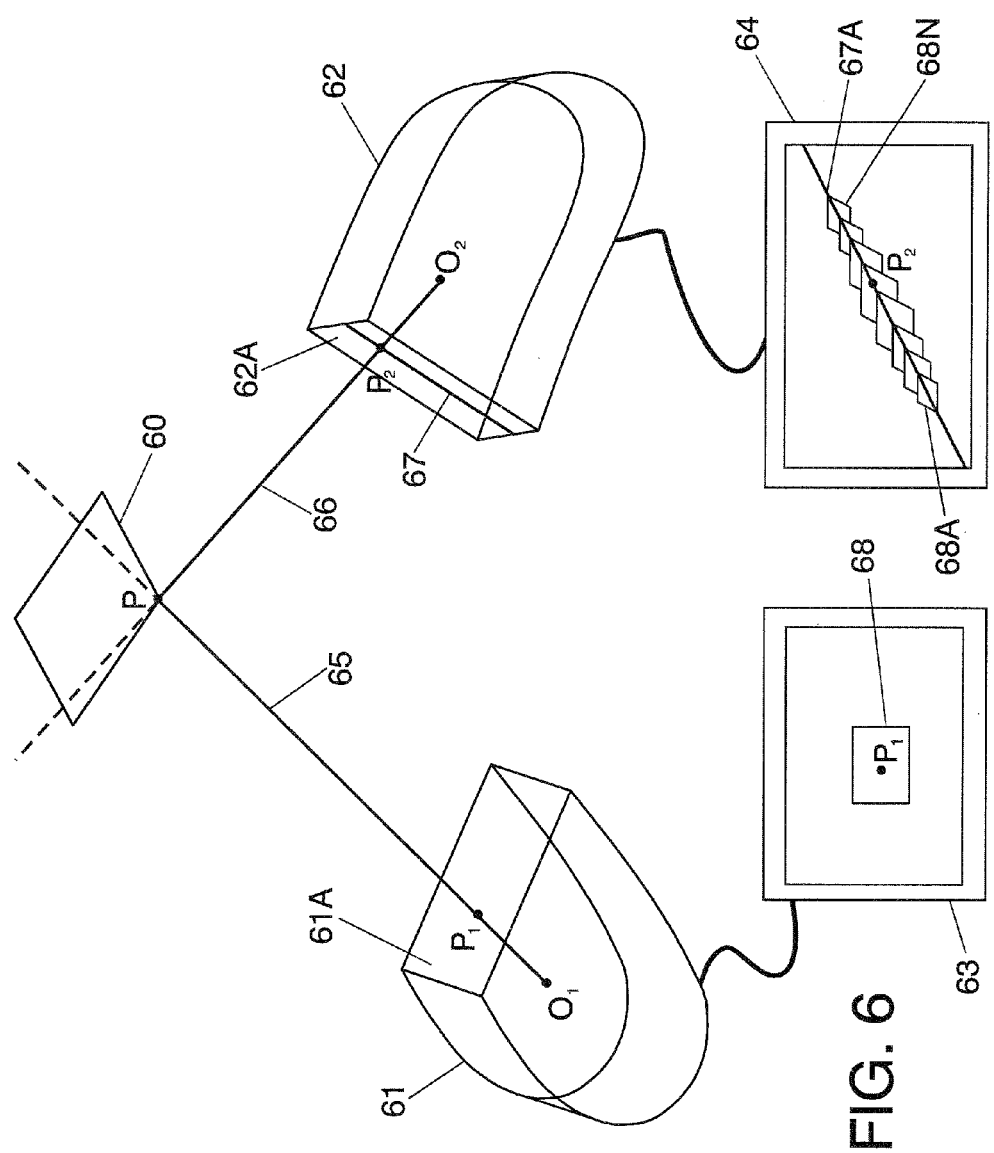
FIG. 6 shows an embodiment for the steps of the method of the present invention for a medium and high level of all the semiautomatic levels for calculating the projection of the selected point.

Given that the difference between the medium level and the high level of all the semiautomatic levels is mainly based on the fact that the high level additionally comprises calculating the characteristic points by means of the corner detection algorithms of the state of the art, the implementation of FIG. 6 serves to show the steps of the method comprised in the medium level as well as in the high level.

FIG. 6 shows an embodiment for the steps of the method of the present invention for the medium level and the high level of the semiautomatic calculation option for calculating the projection of the selected point by the image plane provided by the first camera on the image plane provided by the second camera. The first step of the method shown in the embodiment of FIG. 6 is to select a point P of the flat object (60) and a first image point ($P_1$) representing the selected point in the image plane (61A) of the first camera (61) which is shown in a graphical user interface (63). The second step is to determine a first image area (68) containing the first image point ($P_1$) and the image points surrounding the first image point, and storing the information values of the image points selected from among the color, the color intensity and a combination thereof (not shown), of each of the image points contained in the first image area. The third step is to calculate a first "infinite" ray (65) passing through the center ($O_1$) of the first camera (61) and the first image point ($P_1$). To improve understanding, the first ray (65) and the second ray (66) are shown with a solid line from the centers ($O_1$, $O_2$) of the cameras to the point P, and with a dotted line from the point P to infinity. Since the 3D coordinates of the center ($O_1$) of the first camera and the first image point ($P_1$) are known, the coordinates of the first ray are automatically calculated. The fourth step is to calculate the epipolar line (67) on the image plane (62A) of the second camera (62). The epipolar line is the line on the image plane of the second camera representing the first ray. The epipolar line (67) is represented as a line (67A) on the user interface (64). The fifth step is to determine a second image area (68A, . . . , 68N) containing an image point of the epipolar line and the image points around the image point of the epipolar line and storing the information values of the image points selected from among the color, the color intensity and a combination thereof (not shown), of each of the image points contained inside the second image area. The sixth step is to compare the information values of the image point of the second area with the information values of the image point of the first area. The seventh step is to repeat the fifth step and the sixth step for each of the image points comprised by the epipolar line. The eighth step is to select an image point ($P_2$), called the second image point, which best represents the selected point (P) by means of an option selected from manual and automatic.

The automatic form comprises selecting the second image point as the image point from the total image points comprised by the epipolar line, for which the second image area thereof comprises a reduction index of the first image area greater than a threshold. The manual form comprises highlighting with a predetermined color the second image point, which is selected as the image point from the total image points comprised by the epipolar line, for which the second image area of the second image point comprises a reduction index of the first image area greater than a threshold, and selecting the highlighted point (P2) by he graphical user interface (64A).

Figure 7:
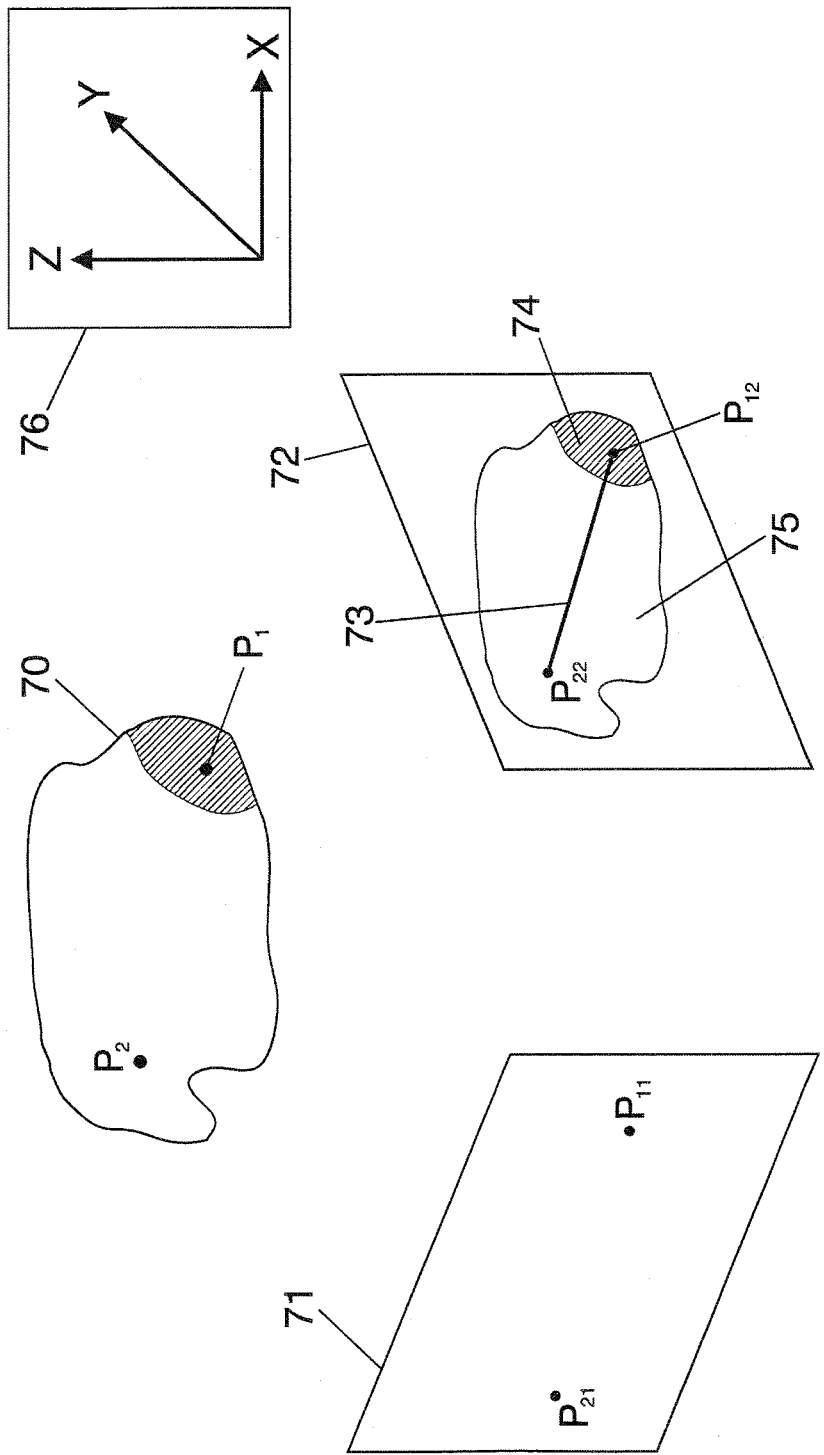
FIG. 7 shows an embodiment of the method of the present invention for calculating the regions and subregions comprised in the flat object by means of an automatic mode.

FIG. 7 shows an embodiment of the method of the present invention for calculating the regions and subregions comprised in the flat object (70) by means of the automatic mode. The first step is to select at least two points ($P_1$, $P_2$) belonging to the plane, the image points ($P_{11}$, $P_{21}$) P of the image plane of the first camera (71) representing the selected points, the projections of these points ($P_{12}$, $P_{22}$) on the image plane (72) of the second camera, these projections being several points selected from among the second image points. The second step is to draw the line segment (73) between the image points ($P_{22}$, $P_{12}$) P comprised in the image plane of the second camera (72). The third step is to store several information values of the image points selected from the color and the color intensity of the image points comprised in the line segment. The fourth step is to calculate a two-dimensional histogram (76) representing in one dimension (X) all the possible information values of an image point which could have been given to an image point in the space domain, and in other dimension (Y), the number of times that a certain information value of an image point, selected from the color and the color intensity, has appeared in the line segment. The histogram thus shows several peaks for the most repeated values of color or color intensity. The fifth step is to identify, for each peak of the histogram (77), several identifying image points which, comprised in the line segment (73), have values of color and color intensity represented in each peak. The sixth step is to calculate a subregion (74, 75), for each of the identifying image points, which are formed by the image points surrounding the identifying image point and which comply with a predetermined similarity criterion. The seventh step is to repeat the previous step for as many subregions as identifying image points have been identified. Finally, the eighth step is to form a region of the flat object by means of the connection of the previously calculated subregions.

Figure 8:
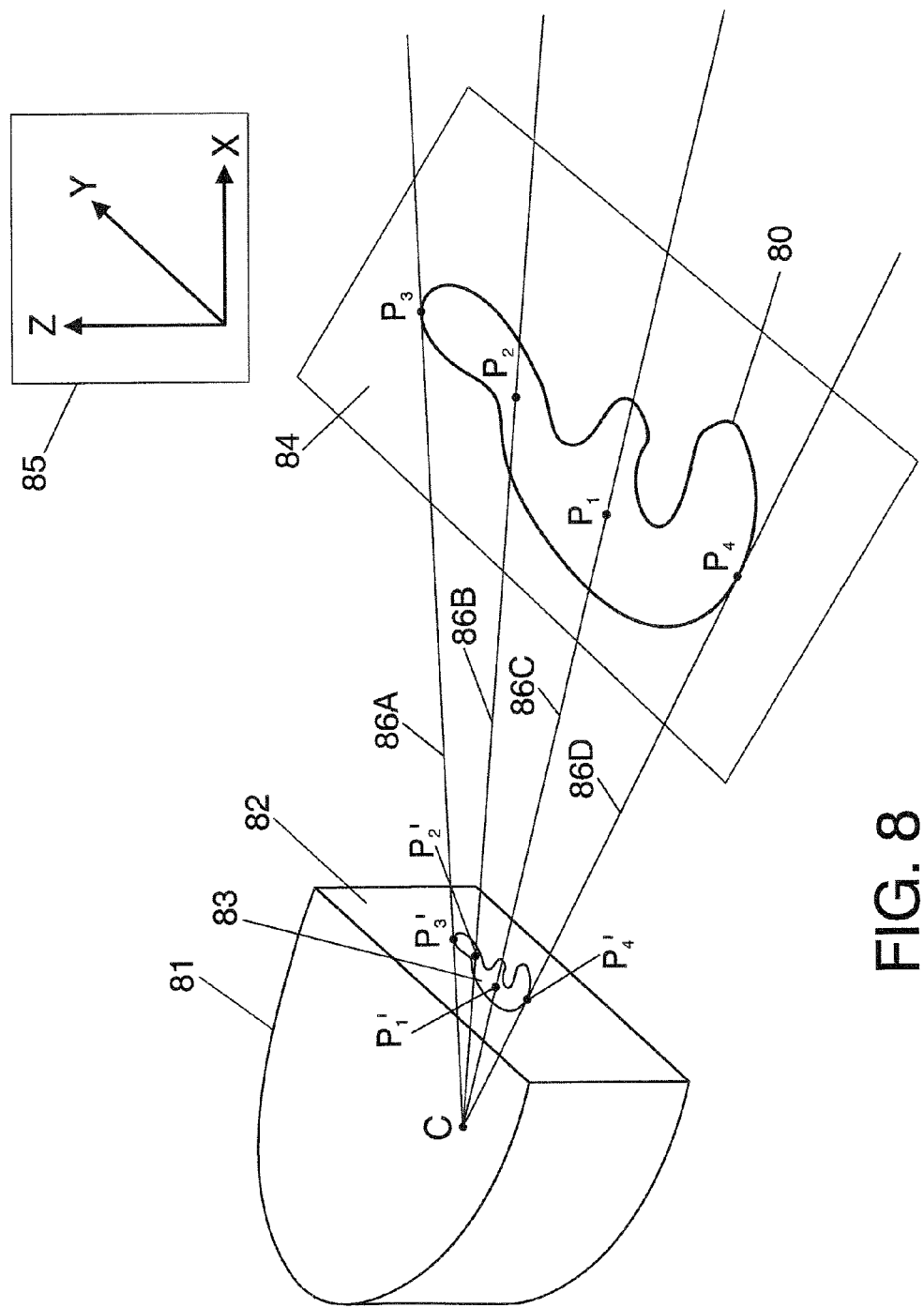
FIG. 8 shows an embodiment of the method of the present invention applied to the calculation of the flat object.

FIG. 8 shows an implementation of the method of the present invention applied to the calculation of an arbitrarily shaped flat object. After the camera calibration of the first camera (81) with respect to the global coordinate system (85), the equation of the plane (84) is calculated by means of calculating the 3D coordinates of the three points (for example, $P_1$, $P_2$, and $P_4$) belonging to the plane (84). Then, a region (83) in the image plane (82) of the first camera (81) is selected, as well as the points $P_1$, $P_2$, $P_3$ and $P_4$ comprised in the object forming a point cloud. Finally, the arbitrarily shaped flat object (80) remains defined by the intersection between the rays (for example: 86A, 86B, 86C, 86D) defined by the center of the camera (C) and any point (for example, $P_1'$, $P_2'$, $P_3'$, $P_4'$) comprised in the selected region (83) representing the surface of the object and the equation of the plane (84). In other words, of the entire infinite region comprised by the equation of the plane, the sought region delimits the plane obtaining the flat object and, therefore, its 3D coordinates.

The invention claimed is:

1. Method for generating a model of a flat object from views of the flat object, wherein it generates a representation selected from among a depth map of the flat object, a volumetric representation of the flat object and a mesh representation of the flat object, by means of at least the following steps:
   i) calibrating at least a first camera and a second camera;
   ii) calculating the 3D coordinates of at least three points belonging to a plane of the flat object;
   iii) calculating a equation of the plane comprised in the flat object;
   iv) selecting at least one region representing the surface of the flat object, in at least one image plane provided by at least one camera; and,
   v) calculating an intersection between the selected region representing the surface of the object and the equation of the plane, wherein step ii) additionally comprises: selecting a point and a first image point, in which the first image point represents the selected point in the image plane provided by the first camera, and in which said selected point is comprised in the flat object; calculating a first ray joining the center of the first camera with the first image point, and also with the selected point; calculating the projection of the selected point on the image plane provided by the second camera; calculating at least one second ray by means of at least the image plane of the second camera, connecting the center of the second camera with the second image point and also with the selected point; determining the 3D coordinates of the selected point by means of calculating the point of intersection between the first ray and at least one second ray; repeating the previous steps for at least two more points, obtaining at least the 3D coordinates of three points belonging to the plane of the flat object.

2. Method for generating a model of a flat object from views of the object according to claim 1, wherein step i) additionally comprises calculating the extrinsic and intrinsic parameters of at least the first camera and second camera by solving the equations for as many points in 2D/3D as degrees of freedom the cameras comprise.

3. Method for generating a model of a flat object from views of the object according to claim 1, wherein the projection of the selected point on the image plane of the second camera is calculated by means of a calculation option selected from manual and semiautomatic.

4. Method for generating a model of a flat object from views of the object according to claim 3, wherein the manual calculation option comprises a user, by means of a graphical user interface showing at least the image plane provided by the second camera, selecting the image point which best represents the point previously selected by means of the image plane provided by the first camera.

5. Method for generating a model of a flat object from views of the object according to claim 3, wherein the semiautomatic calculation option is selected from semiautomatic levels as a set comprised by a low level, a medium level and a high level.

6. Method for generating a model of an object from views of the object according to claim 5, wherein the low level comprises the following steps:
   calculating an epipolar line in at least the image plane provided by the second camera, wherein said epipolar line is the line drawn on the image plane of the second camera representing the first ray by means of the calibration of the cameras;
   representing the epipolar line by means of the graphical user interface;
   and, selecting a second image point on the graphical user interface, wherein the second image point is a selected point along the epipolar line which best represents the selected point by means of the image plane provided by the first camera.

7. Method for generating a model of a flat object from views of the object according to claim 5, wherein the medium level comprises the following steps:
- a) determining a first image area containing at least the first image point and storing at least one information value of the image point selected from among the color, the color intensity and a combination thereof, of at least the first image point and each of the image points surrounding the first image point;
- b) calculating an epipolar line in at least the image plane provided by the second camera, wherein said epipolar line is the line drawn on the image plane of the second camera representing the first ray by means of the calibration of the cameras;
- c) determining a second area containing at least one image point comprised in the epipolar line, and storing at least one information value of the image point selected from among the color, the color intensity and a combination thereof, of at least said first image point comprised in the epipolar line and each of the image points surrounding the image point comprised in the epipolar line;
- d) comparing the information value of the image point of the first image area with the information value of the image point of the second image area;
- e) repeating steps c) and d) for each of the image points forming the epipolar line; and,
- f) selecting a second image point from among a group of image points formed by the image points obtained in each repetition by means of an option selected from manual and automatic; the automatic option comprises selecting the second image point as the image point from the total image points comprised by the epipolar line, for which the second image area of the image point comprises a reproduction index of the first image area greater than a threshold; the manual form comprises highlighting with a predetermined color the second image point, which is selected as the image point from the total image points comprised by the epipolar line, for which the second image area of the second image point comprises a reproduction index of the first image area greater than a threshold, and selecting a point from among those highlighted by the graphical user interface.

8. Method for generating a model of a flat object from views of the object according to claim 5, wherein the high level comprises the following steps:
- a) determining a set of characteristic points in at least the image planes provided by the first camera and the second camera, said characteristic points being those located in corners and edges of the object, and in the surfaces of objects with texture, the points obtained by a corner detection algorithm;
- b) comparing the first image point with a previously determined characteristic point;
- c) determining a first image area containing at least the first image point and storing at least one information value of the image point selected from among the color, the color intensity and a combination thereof for at least the first image point and each of the image points surrounding the first image point;
- d) calculating an epipolar line in at least the image plane provided by the second camera, wherein the epipolar line is the line drawn on the image plane of the second camera representing the first ray by means of the calibration of the cameras;
- e) determining a second image area comprising at least one image point contained in the epipolar line, and storing at least one information value of the image point selected from among the color, the color intensity and a combination thereof, of at least the image point contained in the epipolar line and each image point surrounding the image point contained in the epipolar line;
- f) comparing the information value of the image point of the first image area with the information value of the image point of the second image area;
- g) repeating steps e) and f) for each of the image points forming the epipolar line; and,
- h) selecting a second image point from among a group of image points formed by the image points obtained in each of the repetitions by means of an option selected from manual and automatic; the automatic option comprises selecting the second image point as the image point from the total image points comprised by the epipolar line, for which the second image area of the image point comprises a reproduction index of the first image area greater than a threshold; the manual form comprises highlighting with a predetermined color the second image point, which is selected as the image point from the total image points comprised by the epipolar line, for which the second image area of the second image point comprises a reproduction index of the first image area greater than a threshold and selecting a point from among those highlighted by means of the graphical user interface.

9. Method for generating a model of a flat object from views of the object according to claim 6, wherein the ray joining the center of the first camera with the selected point and at least the ray joining the center of the second camera with the selected point are defined by the respective line equations by means of the following steps:
- obtaining the 3D location of the center of the camera of the calibrated coordinate system;
- obtaining the 3D location of the first image point and of the second image point which represent the same selected point in at least the image plane of the first camera and the image plane of the second camera, respectively; and,
- determining at least a first line equation and a second line equation, the first line equation being described by the vector joining the 3D location of the center of the first camera with the 3D location of the first image point and the second equation being described by the vector connecting the 3D location of the center of the second camera with the 3D location of the second image point.

10. Method for generating a model of a flat object from views of the object according to claim 9, wherein the determination of the coordinates of at least one point in 3D by means of calculating the point of intersection between the first ray and at least the second ray additionally comprises:
- establishing the coordinates of at least one point in 3D when the point of intersection between the first ray and the at least second ray simultaneously belongs to the first equation and to the second equation which determine said first ray and said at least second ray respectively; and,
- calculating the coordinates of a point in 3D the distance of which to said first ray and said at least second ray is minimum when there is no point of intersection between said first ray and said at least second ray.

11. Method for generating a model of a flat object from views of the object according to claim 9, wherein step iii) additionally comprises:

calculating the expression of the plane determined by the following equation:

$$a_N \cdot (x-x_D) + b_N \cdot (y-y_D) + c_N \cdot (z-z_D) = 0$$

wherein $x_D$, $y_D$ and $z_D$ are the coordinates of the point in 3D belonging to the plane of the object and $a_N$, $b_N$, and $c_N$ are the coordinates of a vector N normal to the plane; the vector N normal to the plane is the vector product of two vectors belonging to the plane and defined by at least three points in the plane of the flat object.

12. Method for generating a model of a flat object from views of the object according to claim 7, wherein the step which comprises selecting at least one region representing the surface of the object, in at least one image plane provided by at least one camera, is performed by means of an option selected from manual and automatic; the manual option comprising at least the following steps:

calculating a sub-region which comprises selecting each of the image points surrounding an image point selected by means of the graphical user interface, in which said image points comply with a similarity criterion; the similarity criterion being a predetermined comparison between the information values of the image point selected from among the color and the color intensity of each of said image points surrounding the image point;

repeating the previous step for as many subregions as established by the user; and;

forming a region of the flat object by means of the connection of the previously calculated regions;

and the automatic option comprising at least the following steps:

selecting at least two image points in the same image plane which best represent the at least two points of the flat object, in which said at least two image points are selected from among the two first image points of the first camera and the two second image points in the image plane of at least the second camera;

storing the information values of the image points selected from the color and the color intensity of the image points comprised in the line segment connecting the two image points selected in the previous step;

calculating a two-dimensional histogram which represents in one dimension all the values of the possible information values of the image points which an image point has in the space domain, and in the other dimension, the number of times that a certain information value of an image point selected from the color and the color intensity has appeared in the line segment; such that the histogram has peaks for the information values of image points selected from the most repeated colors and color intensity;

identifying, for each peak of the histogram, the image points which, comprised in the line segment, have the information values of image points of color and color intensity represented in each of the peaks;

calculating a sub-region for each of the identifying image points which are formed by the image points surrounding the identifying image point and which comply with the similarity criterion;

repeating the previous steps for as many subregions as identifying image points have been identified; and, forming a region of the flat object by means of joining the previously calculated subregions.

13. Method for generating a model of a flat object from views of the object according to claim 12, wherein calculating an intersection between the region representing the surface of the object and the equation of the plane additionally comprises the following four substeps:

finding, for each region formed in the image plane of the first camera, at least one ray passing through the center of the first camera and a point comprised in each of the regions;

finding the point of intersection between said at least one ray and the plane, wherein said point of intersection represents the 3D coordinates of a point belonging to the real flat object;

repeating the two previous substeps for each of the points forming the region and forming a point cloud when the region is formed for at least two points;

joining the points of intersection found by at least the first camera inside the selected region.

14. Method for generating a model of a flat object from views of the object according to claim 1, wherein the method additionally comprises the following steps for carrying out the representation of the depth map of the flat object:

selecting a flat region belonging to the object to be modeled;

analyzing, in an image plane of a specific camera, the image points of the regions corresponding to said flat region;

calculating, for each point, the distance from the center of the camera to each point of the flat region;

repeating the two previous steps for each point belonging to the flat region; and, representing the depth map with the previously calculated distances and giving a value selected between zero and a first predetermined value to all the points which are comprised in the selected flat region.

15. Method for generating a model of a flat object from views of the object according to claim 1, wherein the method comprises the following steps for performing the volumetric representation of the flat object:

defining a common coordinate system by means of the calibration of an array of cameras formed by at least two cameras;

defining a delimiting box comprising the flat object to be modeled with reference to the defined coordinate system;

dividing the delimiting box into small volume elements referred to as voxels;

determining for each voxel comprised in the delimiting box whether said voxel is occupied by means of an algorithm selected from a simple algorithm and an improved algorithm; and, representing the volumetric representation by means of representing the occupied voxels.

16. Method for generating a model of a flat object from views of the object according to claim 15, wherein the simple algorithm comprises:

calculating the coordinates of the centroid of each voxel;

calculating the distance from the centroid to a point of the point cloud;

and, labeling the voxel as "occupied" if the previously calculated distance between the centroid and the point of the point cloud is less than a predetermined threshold, and labeling the voxel as "unoccupied" if said distance is greater than the predetermined threshold.

17. Method for generating a model of a flat object from views of the object according to claim 15, wherein the improved algorithm comprises:

calculating the coordinates of the centroid of each voxel;
 calculating the distance from the centroid to the center of the camera;
 identifying the point in the point cloud with the minimum distance to the centroid and the length of the ray passing through the voxel and the center of the camera;
 calculating the distance between the point identified in the point cloud and the center of the camera;
 labeling the voxel as "occupied" if the previously calculated distance between the centroid and the center of the camera is at least equal to the distance between the point identified in the point cloud and the center of the camera and otherwise labeling the voxel as "unoccupied"; and
 applying improvements on the improved algorithm selected from:
  an intersection by volumes which is obtained by means of the two following substeps:
   determining the occupation of the voxels by means of the center of the camera provided by the first camera and at least the second camera independently; and,
   labeling the voxel as "occupied" if and only if it is labeled as "occupied" in each of the views provided by the first camera and at least the second camera;
  an occupation by thickness, comprising the following substeps:
   selecting the thickness "T" of the flat object;
   calculating the coordinates of the centroid of each voxel;
   calculating the distance from the centroid to the center of the camera;
   identifying the point in the point cloud with the minimum distance to the centroid and the length of the ray passing through the voxel and the point in the center of the camera;
   calculating the distance between the point identified in the point cloud and the center of the camera; and
   labeling the voxel as occupied if the previously calculated distance between the centroid and the center of the camera is at least equal to the distance between the point identified in the point cloud and the center of the camera, and smaller than the distance between the point identified in the point cloud and the center of the camera plus the thickness "T" and otherwise labeling the voxel as "unoccupied";
  intersection by volumes with occupation by the thickness which the intersection of the different volumes obtains by means of the following substeps:
   determining the occupation of the voxels by means of the center of the camera provided by the first camera and at least the second camera independently;
   selecting the thickness "T" of the flat object;
   calculating the coordinates of the centroid of each voxel;
   calculating the distance from the centroid to the center of the camera;
   identifying the point in the point cloud with the minimum distance to the centroid and the length of the ray passing through the voxel and the point in the center of the camera;
   calculating the distance between the point identified in the point cloud and the center of the camera;
   labeling, in each view provided by the first camera and the second camera the voxel as "occupied" if the previously calculated distance between the centroid and the center of the camera is at least equal to the distance between the point identified in the point cloud and the center of the camera and smaller than the distance between the point identified in the point cloud and the center of the camera plus the thickness "T" and otherwise labeling the voxel as "unoccupied"; and,
   labeling the voxel as "occupied" if and only if it is labeled as "occupied" in each of the views provided by the first camera and at least the second camera.

18. Method for generating a model of a flat object from views of the object according to claim 1, wherein the method additionally comprises the following steps for performing the mesh representation of the flat object:

determining three points per locally flat surface comprised in the flat object;
 joining the three points forming a triangle;
 joining the triangles obtained forming a mesh; and,
 representing the mesh.

* * * * *